United States Patent
Cho et al.

(10) Patent No.: US 9,958,992 B2
(45) Date of Patent: May 1, 2018

(54) TOUCH SCREEN PANEL AND FABRICATION METHOD THEREOF

(71) Applicant: SAMSUNG DISPLAY CO., LTD., Yongin, Gyeonggi-Do (KR)

(72) Inventors: Ki-Hyun Cho, Suwon-si (KR); Sunhaeng Cho, Hwaseong-si (KR); Kyungseop Kim, Hwaseong-si (KR); Jaeneung Kim, Seoul (KR); CheolKyu Kim, Seoul (KR); Sungkyun Park, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 369 days.

(21) Appl. No.: 14/683,281

(22) Filed: Apr. 10, 2015

(65) Prior Publication Data

US 2016/0041646 A1 Feb. 11, 2016

(30) Foreign Application Priority Data

Aug. 8, 2014 (KR) .......................... 10-2014-0102464

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC . G06F 2203/04103; G06F 2203/04111; G06F 3/044
See application file for complete search history.

(56) References Cited

U.S. PATENT DOCUMENTS

| 6,657,614 | B1 * | 12/2003 | Ito | G06F 3/03543 340/407.1 |
| 8,237,068 | B2 * | 8/2012 | Szaikowski | G06F 3/044 178/18.06 |
| 8,330,740 | B2 * | 12/2012 | Kang | G06F 3/0416 345/174 |
| 8,466,366 | B2 * | 6/2013 | Srinivas | H01B 1/02 174/126.1 |
| 8,568,599 | B1 * | 10/2013 | Yu | G06F 3/044 216/13 |
| 8,659,560 | B2 * | 2/2014 | Nagata | G06F 3/044 178/18.01 |

(Continued)

FOREIGN PATENT DOCUMENTS

| JP | 2013-145486 A | 7/2013 |
| JP | 2013-251220 A | 12/2013 |

(Continued)

*Primary Examiner* — Michael J Jansen, II
(74) *Attorney, Agent, or Firm* — Lee & Morse, P.C.

(57) ABSTRACT

A touch screen panel includes a touch substrate, and a sensing electrode on the touch substrate, the sensing electrode recognizing a touch of a user and having a first sensing insulation layer on the touch substrate, the first sensing insulation layer having a first refractive index, a second sensing insulation layer on the first sensing insulation layer, the second sensing insulation layer having a second refractive index lower than the first refractive index, and the second sensing insulation layer including metal, and a sensing transparent conductive layer on the second sensing insulation layer.

20 Claims, 7 Drawing Sheets

(56) References Cited

U.S. PATENT DOCUMENTS

| | | | | |
|---|---|---|---|---|
| RE44,866 E * | 4/2014 | Kang | | G06F 3/0416 345/174 |
| 8,698,767 B2 * | 4/2014 | Kwak | | G06F 3/044 178/18.05 |
| 8,748,749 B2 * | 6/2014 | Srinivas | | G06F 3/041 174/250 |
| 8,969,731 B2 * | 3/2015 | Srinivas | | G06F 3/041 174/250 |
| 9,001,079 B2 * | 4/2015 | Kang | | G06F 3/0416 345/174 |
| 9,070,488 B2 * | 6/2015 | Ikada | | B32B 15/08 |
| 9,119,305 B2 * | 8/2015 | Takahashi | | B29C 59/002 |
| 9,122,338 B2 * | 9/2015 | Chien | | G06F 3/0421 |
| 9,195,271 B2 * | 11/2015 | Kang | | G06F 1/1643 |
| 9,215,796 B2 * | 12/2015 | Chuang | | H05K 1/0274 |
| 9,217,890 B2 * | 12/2015 | Park | | G02F 1/13338 |
| 9,298,332 B2 * | 3/2016 | Kang | | G06F 3/0416 |
| 9,343,594 B2 * | 5/2016 | Oya | | H01B 1/22 |
| 9,491,853 B2 * | 11/2016 | Gaynor | | B82Y 10/00 |
| 9,541,578 B2 * | 1/2017 | Shimada | | G06F 3/044 |
| 9,591,751 B2 * | 3/2017 | Yoshida | | H05K 1/09 |
| 9,666,337 B2 * | 5/2017 | Gaynor | | H01B 13/0013 |
| 9,791,987 B2 * | 10/2017 | Koo | | G06F 3/044 |
| 2010/0182250 A1 * | 7/2010 | Kang | | G06F 3/044 345/173 |
| 2010/0302206 A1 * | 12/2010 | Yu | | G06F 3/041 345/174 |
| 2011/0032193 A1 * | 2/2011 | Szalkowski | | G06F 3/044 345/173 |
| 2012/0018200 A1 | 1/2012 | Kim et al. | | |
| 2012/0113021 A1 * | 5/2012 | Liu | | G06F 3/041 345/173 |
| 2012/0241825 A1 * | 9/2012 | Aichi | | G02F 1/1368 257/290 |
| 2013/0000952 A1 * | 1/2013 | Srinivas | | H01B 1/02 174/126.1 |
| 2013/0056244 A1 * | 3/2013 | Srinivas | | G06F 3/041 174/250 |
| 2013/0277625 A1 * | 10/2013 | Srinivas | | H01B 1/02 252/514 |
| 2014/0028584 A1 | 1/2014 | Park et al. | | |
| 2014/0035599 A1 * | 2/2014 | Shimata | | G06F 3/044 324/658 |
| 2014/0118634 A1 * | 5/2014 | Kang | | G06F 1/1643 349/12 |
| 2014/0182888 A1 * | 7/2014 | Chuang | | H05K 1/0274 174/251 |
| 2014/0182894 A1 * | 7/2014 | Liu | | G06F 3/044 174/251 |
| 2014/0198266 A1 * | 7/2014 | Park | | G02F 1/13338 349/12 |
| 2014/0202531 A1 * | 7/2014 | Oya | | H01B 1/22 136/256 |
| 2014/0203223 A1 * | 7/2014 | Ikada | | B32B 15/08 252/514 |
| 2014/0267953 A1 * | 9/2014 | Kim | | G06F 3/044 349/12 |
| 2014/0284083 A1 * | 9/2014 | Srinivas | | G06F 3/041 174/251 |
| 2014/0285737 A1 * | 9/2014 | Takahashi | | B29C 59/002 349/12 |
| 2014/0299360 A1 * | 10/2014 | Yoshida | | H05K 1/09 174/251 |
| 2014/0368451 A1 * | 12/2014 | Kang | | G06F 3/044 345/173 |
| 2015/0027755 A1 * | 1/2015 | Tsujimoto | | B82Y 30/00 174/253 |
| 2015/0036062 A1 * | 2/2015 | Chien | | G06F 3/0421 349/12 |
| 2015/0036298 A1 * | 2/2015 | Kim | | B32B 7/12 361/748 |
| 2015/0053459 A1 * | 2/2015 | Fried | | H05K 1/0274 174/251 |
| 2015/0054750 A9 * | 2/2015 | Liu | | G06F 3/041 345/173 |
| 2015/0107977 A1 | 4/2015 | Lee et al. | | |
| 2016/0041646 A1 * | 2/2016 | Cho | | G06F 3/044 345/174 |
| 2016/0073494 A1 * | 3/2016 | Uchida | | H01L 51/0021 345/173 |
| 2016/0133349 A1 * | 5/2016 | Cho | | B82Y 10/00 428/196 |
| 2016/0139710 A1 * | 5/2016 | Yamai | | G06F 3/041 345/174 |
| 2016/0152014 A1 * | 6/2016 | Matsumoto | | B32B 27/18 428/673 |
| 2016/0170521 A1 * | 6/2016 | Choi, II | | G06F 3/044 345/174 |
| 2016/0224140 A1 * | 8/2016 | Matsuda | | G06F 3/041 |
| 2016/0224165 A1 * | 8/2016 | Koo | | G06F 3/041 |
| 2016/0224170 A1 * | 8/2016 | Kim | | G06F 3/044 |
| 2016/0246415 A1 * | 8/2016 | Bae | | G06F 3/044 |
| 2016/0320876 A1 * | 11/2016 | Son | | G06F 3/044 |
| 2017/0098490 A1 * | 4/2017 | Tsujimoto | | H01B 5/14 |
| 2017/0154698 A1 * | 6/2017 | Kim | | H01B 1/02 |
| 2017/0228055 A1 * | 8/2017 | Gaynor | | G06F 3/041 |

FOREIGN PATENT DOCUMENTS

| | | |
|---|---|---|
| KR | 10-2011-0104225 A | 9/2011 |
| KR | 10-2012-0010359 A | 2/2012 |
| KR | 10-2014-0043267 A | 4/2014 |
| KR | 10-2015-0045238 A | 4/2015 |

* cited by examiner

TOUCH SCREEN PANEL AND FABRICATION METHOD THEREOF

CROSS-REFERENCE TO RELATED APPLICATION

Korean Patent Application No. 10-2014-0102464, filed on Aug. 8, 2014, in the Korean Intellectual Property Office, and entitled: "Touch Screen Panel and Fabrication Method Thereof," is incorporated by reference herein in its entirety.

BACKGROUND

1. Field

Embodiments disclosed herein relate to touch screen panels and fabrication methods thereof, and more particularly, to touch screen panels that increase reliability and fabrication methods thereof.

2. Description of the Related Art

A touch screen panel is an input device capable of inputting a user's command by selecting instructions displayed on the screen of an image display device with a person's hand or an object. For this purpose, the touch screen panel is provided to the front face of the image display device and converts a contact position directly in contact with a person's hand or an object into an electrical signal. Accordingly, the instruction selected at the contact position is recognized as an input signal. Since the touch screen panel may replace separate input devices, e.g., a keyboard and/or a mouse, which are connected to the image display device and operated, the range of use thereof tends to be gradually increased.

A resistive layer method, an optical sensing method, and an electrostatic capacitance method are known as methods of implementing the touch screen panel. Among them, the capacitive type touch screen panel converts a contact position into an electrical signal by sensing changes in capacitance that is formed between a conductive sensing electrode and another surrounding sensing electrode or a ground electrode when the panel is in contact with a person's hand or an object. Recently, research to increase the reliability of the capacitive type touch screen panel has been actively conducted.

SUMMARY

Embodiments provide a touch screen panel having high reliability.

Embodiments also provide a method of fabricating a touch screen panel which fabricates a touch screen panel having high reliability.

Embodiments provide touch screen panels including a touch substrate, and a sensing electrode on the touch substrate, the sensing electrode recognizing a touch of a user and having a first sensing insulation layer on the touch substrate, the first sensing insulation layer having a first refractive index, a second sensing insulation layer on the first sensing insulation layer, the second sensing insulation layer having a second refractive index lower than the first refractive index, and the second sensing insulation layer including metal, and a sensing transparent conductive layer on the second sensing insulation layer.

In other embodiments, the touch screen panels may further include a substrate insulation layer. The substrate insulation layer may be formed on the touch substrate and may be connected to the first sensing insulation layer. The substrate insulation layer may be formed on the same layer as the first sensing insulation layer.

In some embodiments, a thickness of the substrate insulation layer may be smaller than a thickness of the first sensing insulation layer.

In other embodiments, a difference between the first refractive index and the second refractive index may be in a range of 0.2 to 0.7.

In still other embodiments, the first refractive index may be in a range of 1.7 to 2.0.

In even other embodiments, the second refractive index may be in a range of 1.3 to 1.5.

In yet other embodiments, the touch substrate may include at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC).

In further embodiments, a thickness of the first sensing insulation layer may be thicker than a thickness of the second sensing insulation layer.

In still further embodiments, at least a portion of the metal may be in a form of a wire.

In even further embodiments, the metal may include a silver (Ag) nanowire.

In yet further embodiments, the first sensing insulation layer may include at least one of silicon oxide, silicon nitride, a silicon-based resin, and an acrylic resin.

In much further embodiments, the second sensing insulation layer may include at least one of a polyvinyl chloride resin, a vinyl chloride-vinyl acetate copolymer, polycarbonate, a polyacryl resin, polymethylmethacrylate, ether-based polyurethane, ester-based polyurethane, polyurethane acrylate, an epoxy resin, and a polyimide resin.

In still much further embodiments, the sensing transparent conductive layer may include at least one of indium tin oxide (ITO), indium zinc oxide (IZO), and indium gallium zinc oxide (IGZO).

In still other embodiments, methods of fabricating a touch screen panel include forming a first insulation layer having a first refractive index on a touch substrate; forming a second insulation layer having a second refractive index lower than the first refractive index and including a metal on the first insulation layer; forming a transparent conductive layer on the second insulation layer; and forming a sensing electrode by patterning the second insulation layer and the transparent conductive layer.

In some embodiments, the forming of the sensing electrode may include forming a photoresist layer on the transparent conductive layer; forming a photoresist pattern by exposing and developing the photoresist layer using a first mask; and forming the sensing electrode by etching the first insulation layer, the second insulation layer, and the transparent conductive layer using the photoresist pattern as a mask.

In other embodiments, the forming of the sensing electrode may include etching the first insulation layer to form a first sensing insulation layer included in the sensing electrode and a substrate insulation layer connected to the first sensing insulation layer. A thickness of the substrate insulation layer may be smaller than a thickness of the first sensing insulation layer, and the thickness of the first sensing insulation layer may be the same as a thickness of the first insulation layer.

In still other embodiments, the thickness of the first insulation layer may be thicker than a thickness of the second insulation layer.

In even other embodiments, the metal may include a silver (Ag) nanowire.

In yet other embodiments, the touch substrate may be formed of at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC).

In further embodiments, a difference between the first refractive index and the second refractive index may be in a range of 0.2 to 0.7.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The foregoing and other objects, features and advantages of the present invention will become more apparent through the description of the embodiments related to drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the drawings, like reference numerals refer to like elements throughout. Sizes of elements in the drawings may be exaggerated for clarity of illustration. Also, though terms like "first" and "second" are used to describe various components, the components are not limited to these terms. These terms are used only to differentiate one component from another one. For example, a component referred to as a first component in an embodiment can be referred to as a second component in another embodiment. In a similar manner, a second component can be referred to as a first component. The terms of a singular form may include plural forms unless otherwise specified.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a touch screen panel according to an embodiment will be described.

Figure 1:
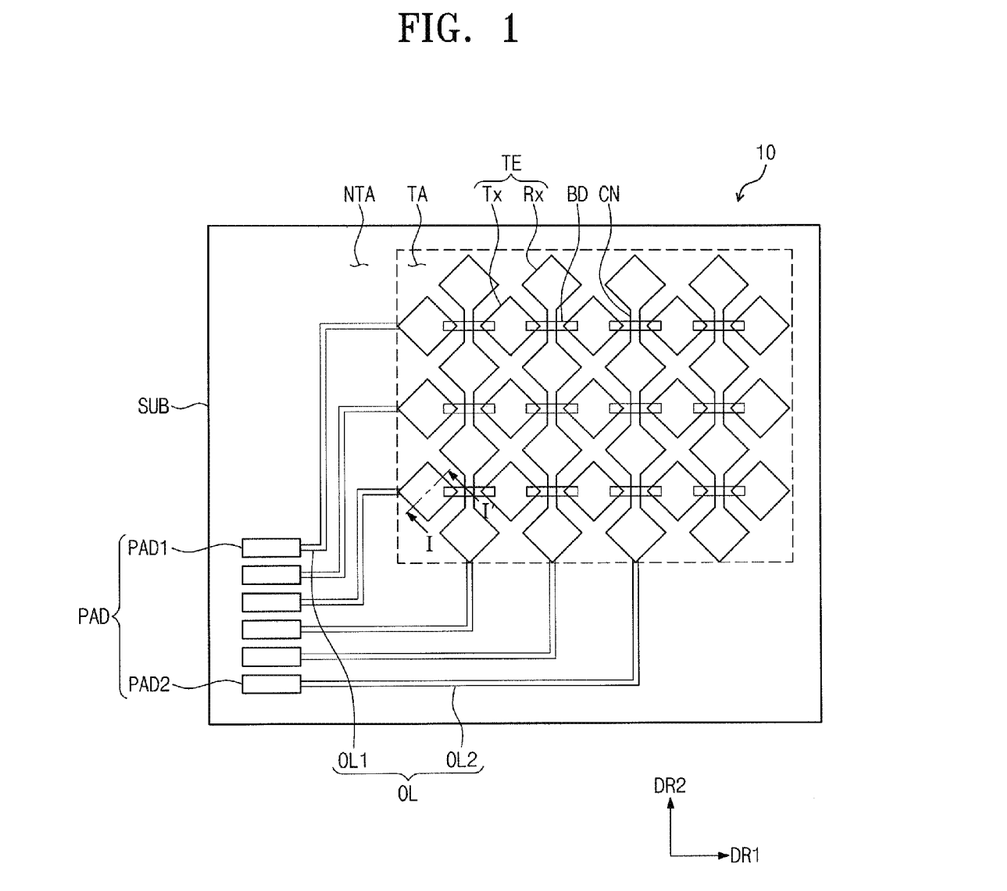
FIG. 1 illustrates a schematic plan view of a touch screen panel according to an embodiment.
Figure 2:
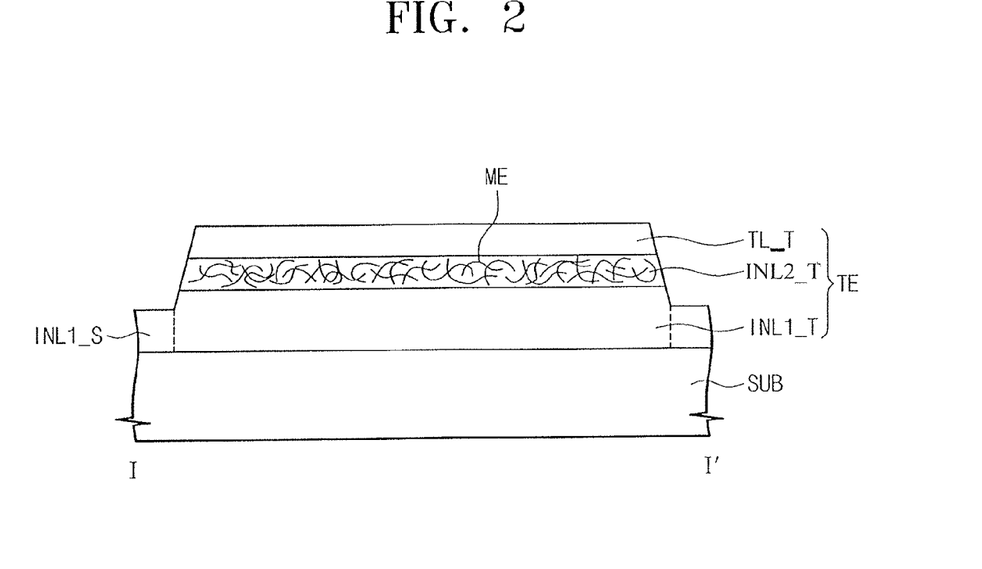
FIG. 2 illustrates a schematic cross-sectional view along line I-I' of FIG. 1.

FIG. 1 is a schematic plan view of a touch screen panel according to an embodiment. FIG. 2 is a schematic cross-sectional view along line I-I' of FIG. 1.

Referring to FIGS. 1 and 2, a touch screen panel 10 according to an embodiment may include a touch substrate SUB and a sensing electrode TE.

A touch may be input in the touch substrate SUB by a user. The touch substrate SUB may be light-transmissible, e.g., transparent to visible light. The touch substrate SUB may be formed of a thermoplastic resin or a thermosetting resin. For example, the touch substrate SUB may include at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC), but embodiments are not limited thereto. The touch substrate SUB may also include glass, but embodiments are not limited thereto. The touch substrate SUB may include at least one of the above compounds and may be flexible. Accordingly, the touch substrate SUB may be used in display devices having flexibility, e.g., a flexible display device, a rollable display device, and a foldable display device.

The touch substrate SUB may include a touch non-recognizing area NTA and a touch recognizing area TA. The touch non-recognizing area NTA does not recognize a touch of a user. The touch recognizing area TA recognizes a touch of a user. The touch non-recognizing area NTA, for example, may surround the touch recognizing area TA. The touch recognizing area TA may have an approximately rectangular shape, but embodiments are not limited thereto.

For example, a pad unit PAD and a peripheral wiring OL may be disposed in the touch non-recognizing area NTA as a dead space region surrounding the touch recognizing area TA. Although FIG. 1 illustrates the disposition of the pad unit PAD on the left side of the touch recognizing area TA as an example, embodiments are not limited thereto, e.g., the pad unit PAD may be disposed at the right side, upper side, or lower side of the touch recognizing area TA.

The pad unit PAD is electrically connected to the sensing electrode TE. The pad unit PAD includes first pad parts PAD1 and second pad parts PAD2. The first pad parts PAD1 are electrically connected to first sensing electrodes Tx. The second pad parts PAD2 are electrically connected to second sensing electrodes Rx. The pad unit PAD may have the same layer structure as that of the sensing electrode TE, and as a result, a fabrication process of the touch screen panel may be simplified.

The peripheral wiring OL is connected to the sensing electrode TE and the pad unit PAD. The peripheral wiring OL is formed on the touch substrate SUB. The peripheral wiring OL includes first peripheral wirings OL1 and second peripheral wirings OL2. The first peripheral wirings OL1 respectively connect between the first sensing electrodes Tx and the first pad parts PAD1. The second peripheral wirings OL2 respectively connect between the second sensing electrodes Rx and the second pad parts PAD2. The peripheral wiring OL may have the same layer structure as that of the sensing electrode TE, and as a result, the fabrication process of the touch screen panel may be simplified.

In the touch recognizing area TA, as an area in which the sensing electrode TE is disposed, a touch input by a user is recognized by the sensing electrode TE. In relation to a touch by a user, when the touch by the user is made, changes in capacitance occur in the sensing electrode TE, e.g., between the first sensing electrodes Tx and the second sensing electrodes Rx which are included in the sensing electrode TE. According to the changes in capacitance, sensing signals applied to the first sensing electrodes Tx may be delayed and provided to the second sensing electrodes Rx. The touch screen panel 10 may sense touch coordinates from delayed values of the sensing signals.

The sensing electrode TE may include the first sensing electrodes Tx and the second sensing electrodes Rx. Each of the first sensing electrodes Tx and the second sensing electrodes Rx are electrically insulated from each other. Each of the first sensing electrodes Tx and the second sensing electrodes Rx may have various shapes, e.g., a rough diamond shape, a cubic shape, a rectangular shape, a circular shape, or an irregular shape (e.g., a shape in which branches are entangled, such as a dendritic structure).

The first sensing electrodes Tx and the second sensing electrodes Rx may be arranged in a matrix form having a plurality of rows extending in a first direction (e.g., DR1 direction of FIG. 1) and a plurality of columns extending in a second direction (e.g., DR2 direction of FIG. 1).

The first sensing electrodes Tx are arranged and respectively spaced apart in the first direction (e.g., DR1 direction of FIG. 1) and the second direction (e.g., DR2 direction of FIG. 1) crossing the first direction (e.g., DR1 direction of FIG. 1). The first sensing electrodes Tx spaced apart in the first direction (e.g., DR1 direction of FIG. 1) are connected by a bridge BD. In the touch screen panel 10 according to an embodiment, the first sensing electrodes Tx that are spaced apart in the first direction (e.g., DR1 direction of FIG. 1) and are connected by the bridge BD are described as an example. However, embodiments are not limited thereto, e.g., the first sensing electrodes Tx that are spaced apart in the first direction may be connected in various forms through a connection unit CN or the like to be described below.

A first sensing electrode, which is disposed at one end of the first sensing electrodes Tx that constitute a single row extending in the first direction (e.g., DR1 direction of FIG. 1) among the first sensing electrodes Tx, is electrically connected to the first pad part PAD1. In FIG. 1, that the first sensing electrode, which is disposed at one end of the first sensing electrodes Tx that constitute a single row extending in the first direction (e.g., DR1 direction of FIG. 1) among the first sensing electrodes Tx, is electrically connected to the first pad part PAD1 is described as an example, but each of the first sensing electrodes Tx disposed at both ends of the first sensing electrodes Tx that constitute a single row extending in the first direction (e.g., DR1 direction of FIG. 1) may be electrically connected to the first pad part PAD1.

The first sensing electrode, which is disposed at one end of the first sensing electrodes Tx that constitute a single row extending in the first direction (e.g., DR1 direction of FIG. 1) among the first sensing electrodes Tx, is electrically connected to the first pad part PAD1 by being connected to the first peripheral wiring OL1. In FIG. 1, that the first sensing electrode, which is disposed at one end of the first sensing electrodes Tx that constitute a single row extending in the first direction (e.g., DR1 direction of FIG. 1) among the first sensing electrodes Tx, is electrically connected to the first pad part PAD1 by being connected to the first peripheral wiring OL1 is described as an example. However, each of the first sensing electrodes Tx disposed at both ends of the first sensing electrodes Tx that constitute a single row extending in the first direction (e.g., DR1 direction of FIG. 1) may be electrically connected to the first pad part PAD1 by being connected to the first peripheral wiring OL1.

The second sensing electrodes Rx are arranged and spaced apart in the first direction (e.g., DR1 direction of FIG. 1) and second direction (e.g., DR2 direction of FIG. 1). The second sensing electrodes Rx spaced apart in the second direction (e.g., DR2 direction of FIG. 1) are connected by the connection unit CN. In the touch screen panel 10 according to the embodiment, the second sensing electrodes Rx that are spaced apart in the second direction (e.g., DR2 direction of FIG. 1) and are connected by the connection unit CN is described as an example. However, embodiments are not limited thereto, e.g., the second sensing electrodes Rx spaced apart in the second direction may be connected in various forms through the bridge BD or the like.

A second sensing electrode, which is disposed at one end of the second sensing electrodes Rx that constitute a single column extending in the second direction (e.g., DR2 direction of FIG. 1) among the second sensing electrodes Rx, is electrically connected to the second pad part PAD2. In FIG. 1, that the second sensing electrode, which is disposed at one end of the second sensing electrodes Rx that constitute a single column extending in the second direction (e.g., DR2 direction of FIG. 1) among the second sensing electrodes Rx, is electrically connected to the second pad part PAD2 is described as an example, but each of the second sensing electrodes Rx disposed at both ends of the second sensing electrodes Rx that constitute a single column extending in the second direction (e.g., DR2 direction of FIG. 1) may be electrically connected to the second pad part PAD2.

The second sensing electrode, which is disposed at one end of the second sensing electrodes Rx that constitute a single column extending in the second direction (e.g., DR2 direction of FIG. 1) among the second sensing electrodes Rx, is electrically connected to the second pad part PAD2 by being connected to the second peripheral wiring OL2. In FIG. 1, that the second sensing electrode, which is disposed at one end of the second sensing electrodes Rx that constitute a single column extending in the second direction (e.g., DR2 direction of FIG. 1) among the second sensing electrodes Rx, is electrically connected to the second pad part PAD2 by being connected to the second peripheral wiring OL2 is described as an example, but each of the second sensing electrodes Rx disposed at both ends of the second sensing electrodes Rx that constitute a single column extending in the second direction (e.g., DR2 direction of FIG. 1) may be electrically connected to the second pad part PAD2 by being connected to the second peripheral wiring OL2.

As illustrated in FIG. 2, the sensing electrode TE may include a first sensing insulation layer INL1_T, a second sensing insulation layer INL2_T, and a sensing transparent conductive layer TL_T.

The first sensing insulation layer INL1_T has a first refractive index. The first sensing insulation layer INL1_T may be light-transmissible, e.g., transparent to visible light. The first sensing insulation layer INL1_T may be an organic insulation layer or an inorganic insulation layer. The first sensing insulation layer INL1_T may include any suitable material, e.g., the first sensing insulation layer INL1_T may include at least one of silicon oxide, silicon nitride, a silicon-based resin, and an acrylic resin.

The first refractive index of the first sensing insulation layer INL1_T may be in a range of about 1.7 to about 2.0. In the case that the first refractive index is less than 1.7, a difference between the first refractive index of the first sensing insulation layer INL1_T and a refractive index of a layer thereon, i.e., a difference between the refractive indices of the first and second sensing insulation layers INL1_T and INL2_T, is small, thereby reducing transmittance. In the case in which the first refractive index is greater than 2.0, it may be difficult for a user to clearly recognize an image because the refractive index is high.

The second sensing insulation layer INL2_T is formed on, e.g., directly on, the first sensing insulation layer INL1_T. The second sensing insulation layer INL2_T has a second refractive index smaller than the first refractive index of the first sensing insulation layer INL1_T. The second sensing insulation layer INL2_T includes a metal ME, e.g., the metal ME may be metal particles of nanowires embedded within the second sensing insulation layer INL2_T.

The second sensing insulation layer INL2_T may be light-transmissible, e.g., transparent to visible light. The second sensing insulation layer INL2_T may be any suitable material, e.g., the second sensing insulation layer INL2_T may be formed of a thermoplastic resin, a thermosetting resin, an ultraviolet-curable resin, a radiation-curable resin, and an adhesive. The second sensing insulation layer INL2_T, e.g., may include at least one of a polyvinyl chloride resin, a vinyl chloride-vinyl acetate copolymer, polycarbonate, a polyacryl resin, polymethylmethacrylate, ether-based polyurethane, ester-based polyurethane, polyurethane acrylate, an epoxy resin, and a polyimide resin. The second sensing insulation layer INL2_T may include the same material as the first sensing insulation layer INL1_T.

The metal ME in the second sensing insulation layer INL2_T may be any suitable metal, e.g., the metal ME may include gold, silver, copper, and/or nickel. The shape of the metal ME, e.g., may have various forms such as a spherical form and/or a wire form. At least a portion of the metal ME may be in a form of a wire, e.g., the metal ME may include a silver (Ag) nanowire.

The second sensing insulation layer INL2_T may include the metal ME and may act as an electrode by being included in the sensing electrode TE. The second sensing insulation layer INL2_T may be light-transmissible by including a space between portions of the metal ME.

The second refractive index may be in a range of about 1.3 to about 1.5. In the case that the second refractive index is less than 1.3, since the refractive index is low, a light extraction efficiency may decrease. In the case in which the second refractive index is greater than 1.5, since the difference between the first refractive index and the second refractive index is small, the transmittance may be reduced.

The difference between the first refractive index and the second refractive index may be in a range of about 0.2 to about 0.7. In the case that the difference between the first refractive index and the second refractive index is less than 0.2, since the difference between the refractive indices is small, the transmittance may be reduced. In the case in which the difference between the first refractive index and the second refractive index is greater than 0.7, since the difference between the refractive indices is large, it may be difficult for a user to clearly recognize an image.

A thickness of the first sensing insulation layer INL1_T may be thicker than a thickness of the second sensing insulation layer INL2_T. When fabricating the touch screen panel 10 according to an embodiment, a first insulation layer (see INL1 of FIG. 4A) and a second insulation layer (see INL2 of FIG. 4B) are etched to form the first sensing insulation layer INL1_T and the second sensing insulation layer INL2_T which are included in the sensing electrode TE. In this case, in order to prevent the etching of the touch substrate SUB, a thickness of the first insulation layer (see INL1 of FIG. 4A) may be formed to be thicker than that of the second insulation layer (see INL2 of FIG. 4B). Accordingly, the thickness of the first sensing insulation layer INL1_T, which is formed by etching a portion of the first insulation layer (see INL1 of FIG. 4A), may be thicker than the thickness of the second sensing insulation layer INL2_T which is formed by etching a portion of the second insulation layer (see INL2 of FIG. 4B).

The sensing transparent conductive layer TL_T is formed on, e.g., directly on, the second sensing insulation layer INL2_T. The sensing transparent conductive layer TL_T may be formed of a transparent conductive oxide (TCO). The transparent conductive oxide may be any suitable material, e.g., the transparent conductive oxide may be formed of at least one of indium tin oxide (ITO), indium zinc oxide (IZO), and indium gallium zinc oxide (IGZO).

The touch screen panel 10 according to an embodiment may further include a substrate insulation layer INL1_S. The substrate insulation layer INL1_S is formed on the touch substrate SUB and is connected to the first sensing insulation layer INL1_T. The substrate insulation layer INL1_S is formed on the same layer as the first sensing insulation layer INL1_T. The substrate insulation layer INL1_S is exposed to the outside.

A thickness of the substrate insulation layer INL1_S may be smaller than the thickness of the first sensing insulation layer INL1_T. When fabricating the touch screen panel 10 according to an embodiment, the first insulation layer (see INL1 of FIG. 4A) is formed and the second insulation layer (see INL2 of FIG. 4B) is then etched. Thus, the etching of the touch substrate SUB may be prevented when forming the second sensing insulation layer INL2_T included in the sensing electrode. The thickness of the substrate insulation layer INL1_S, which is formed by etching the second insulation layer (see INL2 of FIG. 4B) exposed to the outside when the second insulation layer (see INL2 of FIG. 4B) is etched, may be smaller than the thickness of the first sensing insulation layer INL1_T which is formed by etching the second insulation layer (see INL2 of FIG. 4B) not exposed to the outside when the second insulation layer (see INL2 of FIG. 4B) is etched.

The touch screen panel 10 according to an embodiment may be used in display devices including, e.g., a liquid crystal display (LCD), a field emission display (FED), a plasma display panel (PDP), an electroluminescence device (EL), and an electrophoretic display device. In this case, the touch substrate SUB included in the touch screen panel 10 according to an embodiment may be selected as one of the touch substrates SUB constituting the display devices.

In general, a typical touch screen panel does not include the first sensing insulation layer INL1_T between the touch substrate SUB and the second sensing insulation layer INL2_T including the metal ME. In other words, the typical touch screen panel includes a single insulation (with metal therein) on the touch substrate. Accordingly, when a sensing electrode of a typical touch screen panel is formed by etching the single insulation layer, e.g., layer INL2 of FIG. 4B, a portion of the touch substrate may be etched, thereby causing damage to the touch substrate. As a result, haze defects, transmittance defects, and reflectance defects of the touch screen panel may occur.

Also, in the typical touch screen panel, since the metal included in the single insulation layer (see INL2 of FIG. 4B) acts as a mask, the shape of the metal is transferred to the touch substrate and is recognized. Thus, haze defects occur.

Figure 4A:
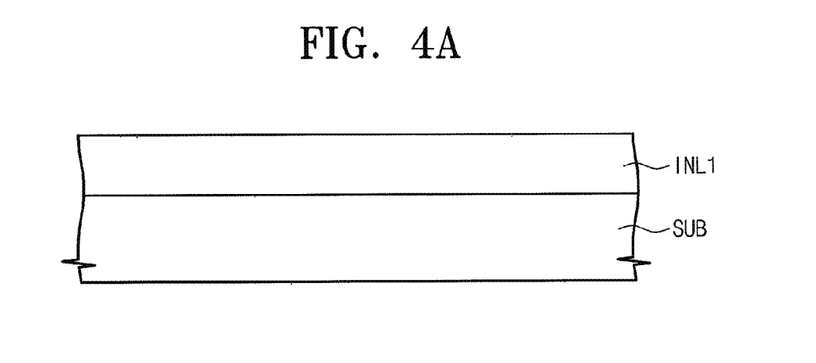
FIGS. 4A to 4F illustrate cross-sectional views of stages in a method of fabricating a touch screen panel according to an embodiment.
Figure 4B:
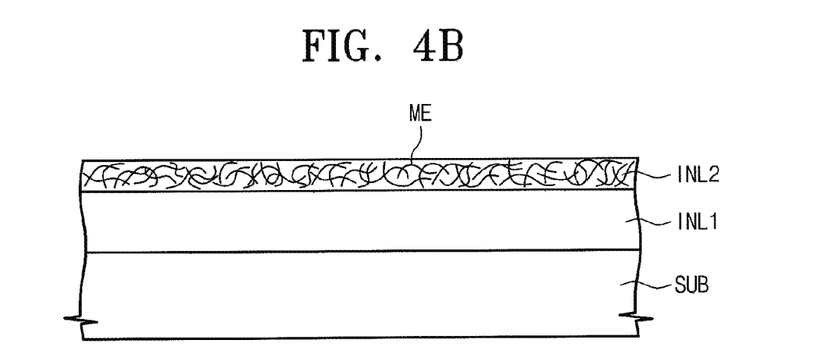

In contrast, since the touch screen panel 10 according to embodiments includes the first sensing insulation layer INL1_T between the touch substrate SUB and the second sensing insulation layer INL2_T including the metal ME, only a portion of the first insulation layer (see INL1 of FIG. 4A) is etched when etching the second insulation layer (see INL2 of FIG. 4B). Thus, the touch substrate SUB is not etched. As a result, in the touch screen panel 10 according to the embodiments, damage to the touch substrate SUB does not occur.

Further, since the touch screen panel 10 according to the embodiments includes the first sensing insulation layer INL1_T between the touch substrate SUB and the second sensing insulation layer INL2_T including the metal ME, the shape of the metal ME is not transferred as it is to the touch substrate SUB and is not recognized. In the touch screen panel 10 according to the embodiments, since the second sensing insulation layer INL2_T has the second refractive index and the first sensing insulation layer INL1_T has the first refractive index higher than the second refractive index, the light transmittance may be increased. Accordingly, the touch screen panel 10 according to the embodiments may improve reliability of the touch screen panel 10.

Hereinafter, a method of fabricating the touch screen panel 10 according to an embodiment will be described. Hereinafter, points different from the above-described touch screen panel 10 according to the embodiment will be mainly described in detail, and undescribed parts will be appreciated referring to the above-described touch screen panel 10 according to the embodiment.

Figure 3:
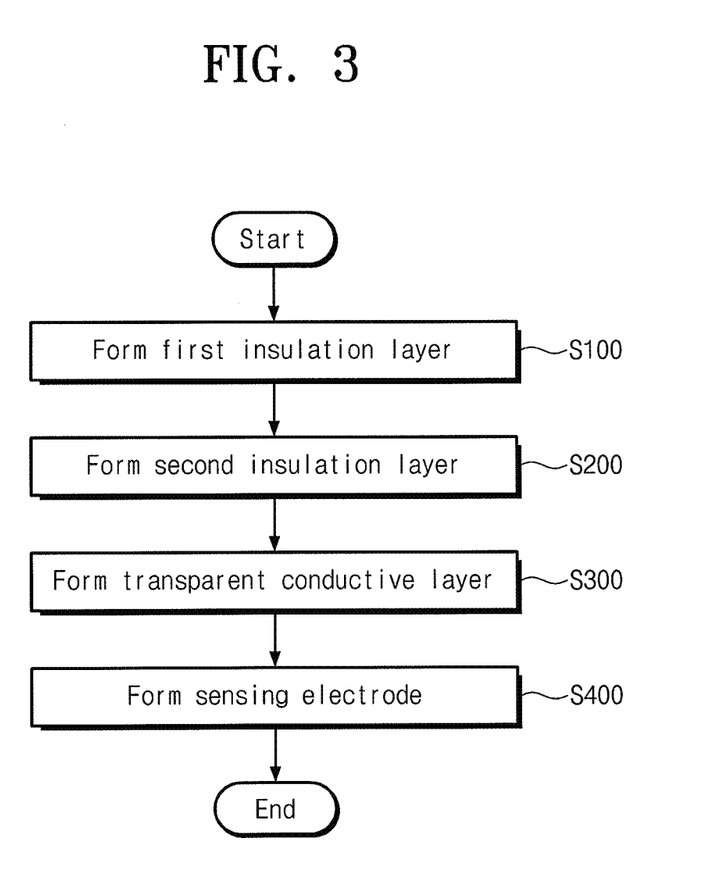
FIG. 3 illustrates a flowchart of a method of fabricating a touch screen panel according to an embodiment.

FIG. 3 is a flowchart schematically illustrating the method of fabricating the touch screen panel 10 according to an embodiment.

Figure 4C:
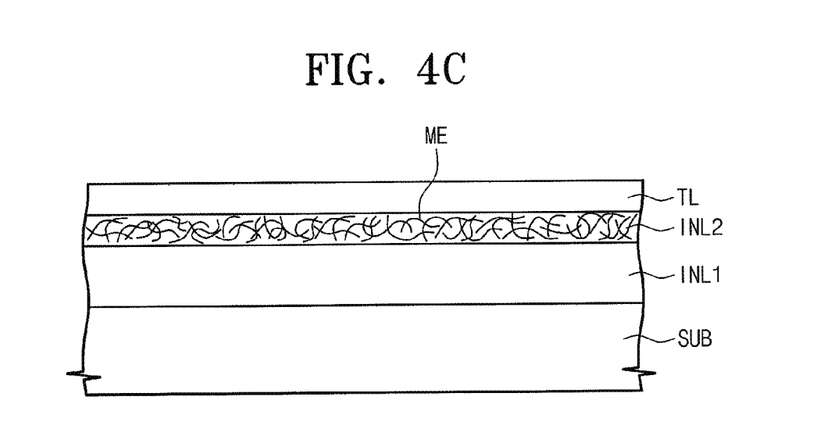
Figure 4D:
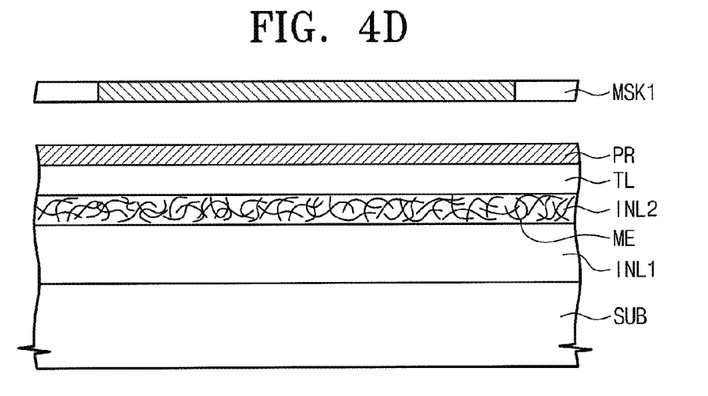

Referring to FIGS. 1-3, the method of fabricating the touch screen panel 10 according to an embodiment may include forming a first insulation layer INL1 (FIG. 4A) having the first refractive index on the touch substrate SUB (S100), forming a second insulation layer INL2 (FIG. 4B) having the second refractive index lower than the first refractive index and including the metal ME on the first insulation layer INL1 (S200), forming a transparent conductive layer TL (FIG. 4C) on the second insulation layer INL2 (S300), and forming the sensing electrode TE by patterning the second insulation layer INL2 and the transparent conductive layer TL (S400).

FIGS. 4A to 4F are cross-sectional views illustrating stages in the method of fabricating the touch screen panel 10 according to an embodiment.

Referring to FIGS. 1 to 3 and 4A, the first insulation layer INL1 having the first refractive index is formed on the touch substrate SUB (S100).

The touch substrate SUB may be any suitable substrate, e.g., the touch substrate SUB may be formed of at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC).

The first insulation layer INL1 may be light-transmissible. The first insulation layer INL1 may be an organic insulation layer or an inorganic insulation layer. The first insulation layer INL1 may be any suitable insulator, e.g., the first insulation layer INL1 may be formed of at least one of silicon oxide, silicon nitride, a silicon-based resin, and an acrylic resin.

The first refractive index may be in a range of about 1.7 to about 2.0. In the case that the first refractive index is less than 1.7, since a difference between the first refractive index and the second refractive index is small, transmittance may be reduced. In the case in which the first refractive index is greater than 2.0, it may be difficult for a user to clearly recognize an image because the refractive index is high.

Referring to FIGS. 1 to 3 and 4B, the second insulation layer INL2 having the second refractive index lower than the first refractive index and including the metal ME is formed on the first insulation layer INL1 (S200).

The second insulation layer INL2 may be light-transmissible. The second insulation layer INL2 may be any suitable insulator, e.g., the second insulation layer INL2 may be formed of a thermoplastic resin, a thermosetting resin, an ultraviolet-curable resin, a radiation-curable resin, and an adhesive. The second insulation layer INL2, for example, may include at least one of a polyvinyl chloride resin, a vinyl chloride-vinyl acetate copolymer, polycarbonate, a polyacryl resin, polymethylmethacrylate, ether-based polyurethane, ester-based polyurethane, polyurethane acrylate, an epoxy resin, and a polyimide resin. The second insulation layer INL2 may include the same material as the first insulation layer INL1.

The second insulation layer INL2 includes the metal ME. The metal ME may be any suitable metal, e.g., the metal ME may include gold, silver, copper, and nickel. The shape of the metal ME may be, e.g., a spherical form and/or a wire form. At least a portion of the metal ME may be in a form of a wire, e.g., the metal ME may include a silver (Ag) nanowire.

Since the second insulation layer INL2 includes the metal ME, the sensing electrode TE, which includes the second sensing insulation layer INL2_T formed by etching the second insulation layer INL2, may act as an electrode. The second insulation layer INL2 may be light-transmissible by including a space between the metals ME.

The second refractive index may be in a range of about 1.3 to about 1.5. In the case that the second refractive index is less than 1.3, since the refractive index is low, a light extraction efficiency may decrease. In the case in which the second refractive index is greater than 1.5, since the difference between the first refractive index and the second refractive index is small, the transmittance may be reduced.

The difference between the first refractive index and the second refractive index may be in a range of about 0.2 to about 0.7. In the case that the difference between the first refractive index and the second refractive index is less than 0.2, since the difference between the refractive indices is small, the transmittance may be reduced. In the case in which the difference between the first refractive index and the second refractive index is greater than 0.7, since the difference between the refractive indices is large, it may be difficult for a user to clearly recognize an image.

A thickness of the first insulation layer INL1 may be thicker than a thickness of the second insulation layer INL2. In the method of fabricating the touch screen panel 10 according to an embodiment, the first insulation layer INL1 and the second insulation layer INL2 are etched to form a first sensing insulation layer INL1_T and a second sensing insulation layer INL2_T, respectively, which are included in the sensing electrode TE. In this case, in order to prevent the etching of the touch substrate SUB, the thickness of the first insulation layer INL1 may be formed to be thicker than that of the second insulation layer INL2.

Referring to FIGS. 1 to 3 and 4C, the transparent conductive layer TL is formed on the second insulation layer INL2 (S300). The transparent conductive layer TL may be formed of a transparent conductive oxide (TCO). The transparent conductive oxide may be, e.g., at least one of ITO, IZO, and IGZO.

Referring to FIGS. 1-3, the sensing electrode TE is formed by patterning the second insulation layer INL2 and the transparent conductive layer TL (S400). The forming of the sensing electrode TE (S400) may include forming a photoresist layer PR on the transparent conductive layer TL (FIG. 4D), forming a photoresist pattern PR_P (FIG. 4E) by exposing and developing the photoresist layer PR using a first mask MSK1, and forming the sensing electrode TE by etching the first insulation layer INL1, the second insulation layer INL2, and the transparent conductive layer TL using the photoresist pattern PR_P as a mask.

In detail, referring to FIGS. 1-3 and 4D, the photoresist layer PR is formed on the transparent conductive layer TL. The photoresist layer PR may be formed by coating a photoresist. The first mask MSK1 is disposed on the photoresist layer PR.

Referring to FIGS. 1-3 and 4E, the photoresist pattern PR_P is formed by exposing and developing the photoresist layer PR using the first mask MSK1. The photoresist pattern PR_P overlaps the sensing electrode. The sensing electrode TE is formed by etching the first insulation layer INL1, the second insulation layer INL2, and the transparent conductive layer TL using the photoresist pattern PR_P as a mask.

Figure 4E:
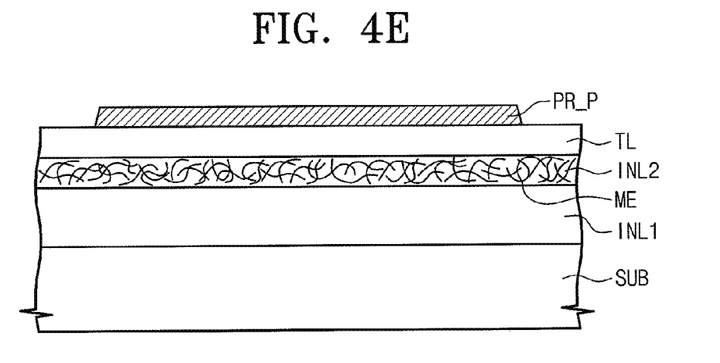
Figure 4F:
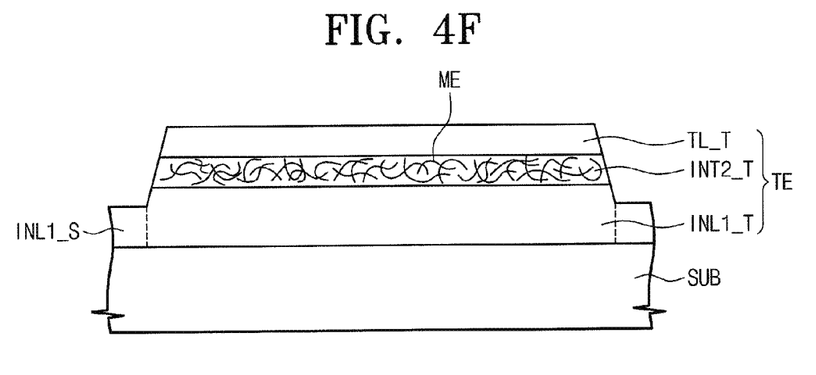

The first insulation layer INL1, the second insulation layer INL2, and the transparent conductive layer TL may be etched with the same etchant using a single process. However, the embodiments are not limited thereto, e.g., and first insulation layer INL1, the second insulation layer INL2, and the transparent conductive layer TL may be etched with different etchants.

The first sensing insulation layer INL1_T and substrate insulation layer INL1_S may be formed by etching the first insulation layer INL1. The first sensing insulation layer INL1_T is included in the sensing electrode TE. The substrate insulation layer INL1_S is connected to the first sensing insulation layer INL1_T. The substrate insulation layer INL1_S may be formed on the same layer as the first sensing insulation layer INL1_T.

When the sensing electrode TE is formed by etching the first insulation layer INL1, the second insulation layer INL2, and the transparent conductive layer TL, since the substrate insulation layer INL1_S is not masked by the photoresist pattern PR_P, the substrate insulation layer INL1_S is exposed to the outside. However, since the first sensing insulation layer INL1_T is masked by the photoresist pattern PR_P, the first sensing insulation layer INL1_T is not exposed to the outside. Thus, a thickness of the substrate insulation layer INL1_S may be smaller than a thickness of the first sensing insulation layer INL1_T, and the thickness of the first sensing insulation layer INL1_T may be the same as the thickness of the first insulation layer INL1.

Referring to FIGS. 1-3 and 4F, the touch screen panel 10 is formed, e.g., finalized, by removing the photoresist pattern PR_P.

In general, in a typical method of fabricating a touch screen panel, the first insulation layer INL1 is not formed between the touch substrate SUB and the second insulation layer INL2 including the metal ME. Accordingly, when the sensing electrode of a typical touch screen panel is formed by etching an insulation layer with metal therein, a portion of the touch substrate may be etched with the insulation layer (as the insulation layer with the metal is directly on the touch substrate in the typical touch screen panel), thereby causing damage to the touch substrate. As a result, haze defects, transmittance defects, and reflectance defects may occur in the touch screen panel. Also, when a touch screen panel is fabricated by the typical method of fabricating a touch screen panel, since the metal included in the second sensing insulation layer (see INL2 of FIG. 4B) acts as a mask, the shape of the metal is transferred as it is to the touch substrate and recognized, thereby causing haze defects.

In contrast, in the method of fabricating the touch screen panel 10 according to embodiments, since the first insulation layer INL1 is included between the touch substrate SUB and the second insulation layer INL2 including the metal ME, only a portion of the first insulation layer INL1 is etched when etching the second insulation layer INL2. Thus, the touch substrate SUB is not etched. As a result, in the touch screen panel 10 fabricated by the method of fabricating a touch screen panel according to the embodiments, the damage to the touch substrate SUB does not occur. Further, since the touch screen panel 10 fabricated by the method of fabricating a touch screen panel according to the embodiments includes the first sensing insulation layer INL1_T between the touch substrate SUB and the second sensing insulation layer INL2_T including the metal ME, the shape of the metal ME is not transferred as it is to the touch substrate SUB and is not recognized. In addition, in the touch screen panel 10 fabricated by the method of fabricating a touch screen panel according to embodiments, since the second sensing insulation layer INL2_T has the second refractive index and the first sensing insulation layer INL1_T has the first refractive index higher than the second refractive index, the light transmittance may be increased. Accordingly, the touch screen panel 10 according to the embodiments may improve the reliability of the touch screen panel 10.

Hereinafter, embodiments will be described in more detail according to specific examples. However, the following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

A 50 μm thick touch substrate formed of polycarbonate (PC) was prepared. A first insulation layer having a refractive index of 1.78 was formed to a thickness of 200 nm on the touch substrate. A second insulation layer including silver nanowires and having a refractive index of 1.47 was formed to a thickness of 90 nm on the first insulation layer. A photoresist layer was coated on the second insulation layer, and a photoresist pattern was formed by etching the photoresist layer using a first mask. A touch screen panel including a sensing electrode was formed by dry etching using the photoresist pattern as a mask. Haze and transmittance of the touch screen panel were measured.

Example 2

A touch screen panel was formed in the same manner as in Example 1, except that the first insulation layer was formed to a thickness of 400 nm. Haze and transmittance of the touch screen panel were measured.

Example 3

A touch screen panel was formed in the same manner as in Example 1, except that the first insulation layer was formed to a thickness of 600 nm. Haze and transmittance of the touch screen panel were measured.

Example 4

A 50 μm thick touch substrate formed of PC was prepared. A first insulation layer having a refractive index of 1.78 was formed to a thickness of 200 nm on the touch substrate. A second insulation layer including silver nanowires and having a refractive index of 1.33 was formed to a thickness of 90 nm on the first insulation layer. A photoresist layer was coated on the second insulation. A photoresist pattern was formed by etching the photoresist layer using a first mask. A touch screen panel including a sensing electrode was formed by dry etching using the photoresist pattern as a mask. Haze and transmittance of the touch screen panel were measured.

Example 5

A touch screen panel was formed in the same manner as in Example 4, except that the first insulation layer was formed to a thickness of 400 nm. Haze and transmittance of the touch screen panel were measured.

Example 6

A touch screen panel was formed in the same manner as in Example 4, except that the first insulation layer was formed to a thickness of 600 nm. Haze and transmittance of the touch screen panel were measured.

Comparative Example 1

A 50 μm thick touch substrate formed of PC was prepared. An insulation layer including silver nanowires and having a refractive index of 1.47 was formed to a thickness of 90 nm on the touch substrate. A photoresist layer was coated on the second insulation layer, and a photoresist pattern was formed by etching the photoresist layer using a first mask. A touch screen panel including a sensing electrode was formed by wet etching using the photoresist pattern as a mask.

Comparative Example 2

A touch screen panel was formed in the same manner as in Comparative Example 1, except that the touch screen panel including a sensing electrode was formed by dry etching.

The Haze and transmittance results of Examples 1-6 are reported in Table 1 below. The Haze and transmittance results of Comparative Examples 1-2 are reported in Table 2 below.

TABLE 1

|  | Haze (%) | Transmittance (%) |
| --- | --- | --- |
| Example 1 | 1.17 | 90.93 |
| Example 2 | 1.04 | 90.38 |
| Example 3 | 1.08 | 89.96 |
| Example 4 | 1.34 | 92.09 |
| Example 5 | 0.95 | 92.58 |
| Example 6 | 0.99 | 92.57 |

TABLE 2

|  | Haze (%) | Transmittance (%) | Reflectance (%) |
| --- | --- | --- | --- |
| Comparative Example 1 | 2.77 | 89.24 | 9.43 |
| Comparative Example 2 | 2.27 | 89.38 | 9.34 |

In general, when a haze value is in a range of 0.9% to 1.5% and a transmittance is in a range of 89% to 93%, a touch screen panel has excellent reliability. Referring to Tables 1 and 2, the touch screen panels of Examples 1 to 6 had a haze value of 0.95% to 1.34% and a transmittance of 89.96% to 92.58%, and thus, it may be confirmed that the touch screen panels of Examples 1 to 6 had excellent reliability. However, since the touch screen panels of Comparative Examples 1 and 2 did not have a haze value of 0.9% to 1.5%, it may be confirmed that the reliabilities of the touch screen panels of Comparative Examples 1 and 2 were reduced.

Figure 5A:
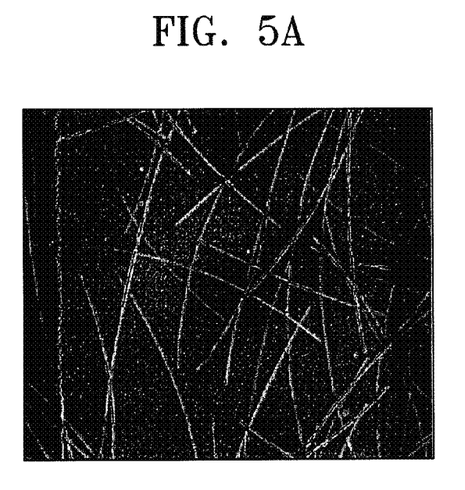
FIGS. 5A and 5B illustrate scanning electron microscope (SEM) images of a portion of a touch screen panel of Comparative Example 1.
Figure 5B:
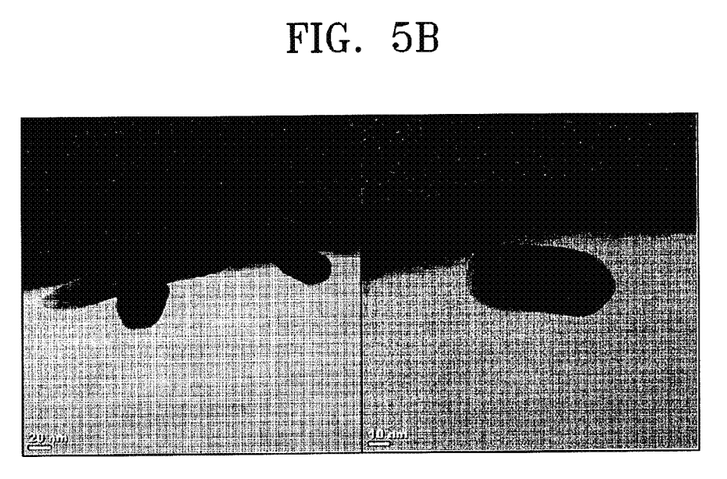
Figure 5C:
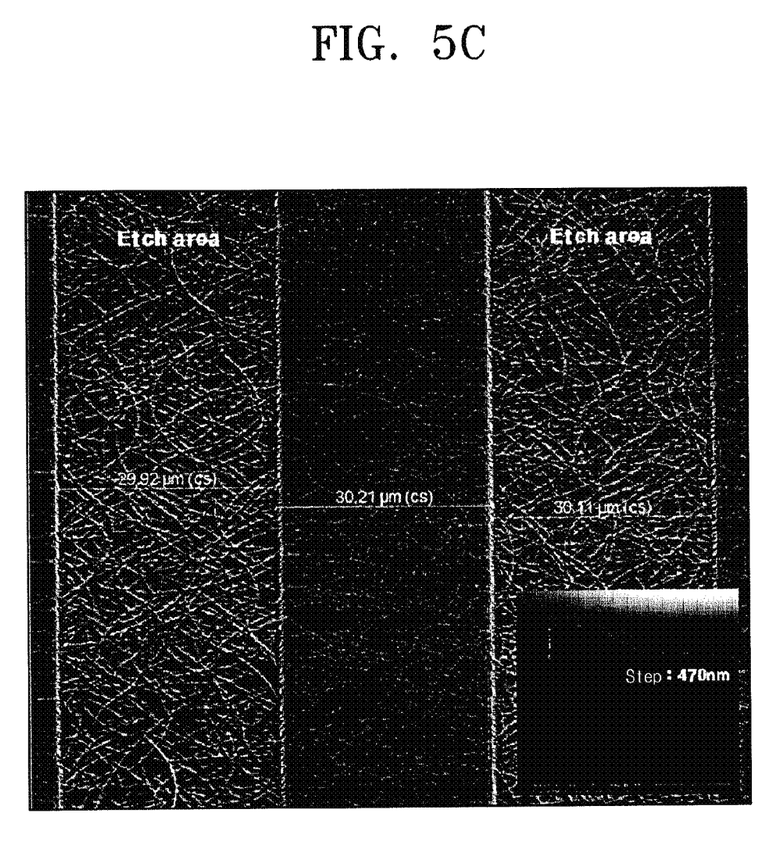
FIG. 5C illustrates a SEM image of a portion of a touch screen panel of Comparative Example 2.

FIGS. 5A and 5B are scanning electron microscope (SEM) images of a portion of the touch screen panel of Comparative Example 1, and FIG. 5C is an SEM image of a portion of the touch screen panel of Comparative Example 2. As illustrated in FIGS. 5A and 5B, in the touch screen panel of Comparative Example 1, silver nanowires remained in a portion of the insulation layer to be etched.

Referring to FIG. 5C, a portion denoted as "Etch area" represents a portion in which the sensing electrode was not formed, while the area between the "etch areas" is a portion corresponding to the sensing electrode. As illustrated in FIG. 5C, in the touch screen panel of Comparative Example 2, since silver nanowires acted as a mask, it may be confirmed that the shape of the silver nanowires was transferred as it is to the touch substrate and recognized even in the "Etch area" in which the sensing electrode was not formed. Since the "Etch area", as the portion in which the sensing electrode was not formed, is a portion in which the entire second insulation layer is etched, silver nanowires must not be presented. Accordingly, the shape of silver nanowires should not be found in the SEM image. However, in the SEM image of the touch screen panel of Comparative Example 2, the shape of silver nanowires was observed in the "Etch area", and as a result, it may be confirmed that haze defects occurred in the touch screen panel of Comparative Example 2 when measuring the haze thereof.

According to a touch screen panel according to an embodiment, reliability may be increased. According to a method of fabricating a touch screen panel according to an embodiment, a touch screen panel capable of increasing reliability may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
a touch substrate;
a substrate insulation layer formed on the touch substrate; and a plurality of sensing electrodes formed on the touch substrate,
the plurality of sensing electrodes recognizing a touch of a user,
wherein the sensing electrode includes:
a first sensing insulation layer formed on the touch substrate, the first sensing insulation layer having a first refractive index,
a second sensing insulation layer formed on the first sensing insulation layer,
the second sensing insulation layer having a second refractive index lower than the first refractive index, and the second sensing insulation layer including metal particles of nanowires embedded within, the second sensing insulation layer covering the first sensing insulation layer, wherein the substrate insulation layer is exposed from the second sensing insulation layer, and a sensing transparent conductive layer formed on the second sensing insulation layer.

2. The touch screen panel as claimed in claim 1, wherein the substrate insulation layer is connected to the first sensing insulation layer and is formed in a same layer as the first sensing insulation layer.

3. The touch screen panel as claimed in claim 2, wherein a thickness of the substrate insulation layer is smaller than a thickness of the first sensing insulation layer.

4. The touch screen panel as claimed in claim 1, wherein a difference between the first refractive index and the second refractive index is 0.2 to 0.7.

5. The touch screen panel as claimed in claim 1, wherein the first refractive index is 1.7 to 2.0.

6. The touch screen panel as claimed in claim 1, wherein the second refractive index is 1.3 to 1.5.

7. The touch screen panel as claimed in claim 1, wherein the touch substrate includes at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC).

8. The touch screen panel as claimed in claim 1, wherein a thickness of the first sensing insulation layer is larger than a thickness of the second sensing insulation layer.

9. The touch screen panel as claimed in claim 1, wherein at least a portion of the metal in the second sensing insulation layer is in a form of a wire.

10. The touch screen panel as claimed in claim 1, wherein the metal particles in the second sensing insulation layer includes particles of silver (Ag) nanowire.

11. The touch screen panel as claimed in claim 1, wherein the first sensing insulation layer includes at least one of silicon oxide, silicon nitride, a silicon-based resin, and an acrylic resin.

12. The touch screen panel as claimed in claim 1, wherein the second sensing insulation layer includes at least one of a polyvinyl chloride resin, a vinyl chloride-vinyl acetate copolymer, polycarbonate, a polyacryl resin, polymethylmethacrylate, ether-based polyurethane, ester-based polyurethane, polyurethane acrylate, an epoxy resin, and a polyimide resin.

13. The touch screen panel as claimed in claim 1, wherein the sensing transparent conductive layer includes at least one of indium tin oxide (ITO), indium zinc oxide (IZO), and indium gallium zinc oxide (IGZO).

14. A method of fabricating a touch screen panel, the method comprising:
forming a first insulation layer having a first refractive index on a touch substrate;
forming a second insulation layer having a second refractive index lower than the first refractive index on the first insulation layer, the second insulation layer including metal particles of nanowires embedded within;
forming a transparent conductive layer on the second insulation layer; and
forming a plurality of sensing electrodes by patterning the first insulation layer, the second insulation layer, and the transparent conductive layer,
wherein forming the plurality of sensing electrodes includes etching the first insulation layer to form a first sensing insulation layer included in the sensing electrode and a substrate insulation layer connected to the first sensing insulation layer on the touch substrate, and
wherein a thickness of the substrate insulation layer and a thickness of first sensing insulation layer are different.

15. The method as claimed in claim 14, wherein forming the plurality of sensing electrodes includes: forming a photoresist layer on the transparent conductive layer; forming a photoresist pattern by exposing and developing the photoresist layer using a first mask; and forming the plurality of sensing electrodes by etching the first insulation layer, the second insulation layer, and the transparent conductive layer using the photoresist pattern as a mask.

16. The method as claimed in claim 14, wherein:
the thickness of the substrate insulation layer is smaller than the thickness of the first sensing insulation layer, and
the thickness of the first sensing insulation layer is the same as a thickness of the first insulation layer.

17. The method as claimed in claim 14, wherein a thickness of the first insulation layer is thicker than a thickness of the second insulation layer.

18. The method as claimed in claim 14, wherein the metal particles of nanowires includes a silver (Ag) nanowire.

19. The method as claimed in claim 14, wherein the touch substrate is formed of at least one of polycarbonate (PC), polyethylene terephthalate (PET), polyethylene (PE), polypropylene (PP), polysulfone (PSF), polymethylmethacrylate (PMMA), triacetyl cellulose (TAC), a cycloolefin polymer (COP), and a cycloolefin copolymer (COC).

20. The method as claimed in claim 14, wherein a difference between the first refractive index and the second refractive index is 0.2 to 0.7.

* * * * *